(12) United States Patent
Yang

(10) Patent No.: US 8,419,344 B2
(45) Date of Patent: Apr. 16, 2013

(54) SYSTEM AND METHOD FOR MEASURING EFFICIENCY AND LEAKAGE IN A STEAM TURBINE

(75) Inventor: Virginia Yang, Latham, NY (US)

(73) Assignee: General Electric Company, Schenectady, NY (US)

(*) Notice: Subject to any disclaimer, the term of this patent is extended or adjusted under 35 U.S.C. 154(b) by 756 days.

(21) Appl. No.: 12/542,580

(22) Filed: Aug. 17, 2009

(65) Prior Publication Data
US 2011/0038712 A1 Feb. 17, 2011

(51) Int. Cl.
*F01D 1/00* (2006.01)
(52) U.S. Cl.
USPC .............................. 415/1; 415/118
(58) Field of Classification Search .............. 415/1, 118, 415/232; 60/39.182, 650
See application file for complete search history.

(56) References Cited

U.S. PATENT DOCUMENTS

| | | | |
|---|---|---|---|
| 3,588,265 A * | 6/1971 | Berry .............................. | 415/17 |
| 4,005,581 A * | 2/1977 | Aanstad .......................... | 60/660 |
| 5,411,365 A * | 5/1995 | Mazzola et al. ................ | 415/93 |
| 6,868,363 B2 | 3/2005 | Baran et al. | |
| 6,901,348 B2 | 5/2005 | Smith et al. | |
| 7,549,834 B2 | 6/2009 | Kirchhof et al. | |
| 7,658,073 B2 * | 2/2010 | Hernandez et al. ............. | 60/677 |
| 8,113,764 B2 * | 2/2012 | Hernandez et al. ............... | 415/1 |
| 2007/0104306 A1 * | 5/2007 | Umezawa et al. ............ | 376/317 |
| 2011/0038712 A1 * | 2/2011 | Yang ............................. | 415/118 |

OTHER PUBLICATIONS

Caudill et al., "Analysis of Leakage Between HP and IP Turbines Using PEPSE", Presented at Scientech 1990 Users Group Meeting, 1990.*
Webshot of http://famos.scientech.us/Technical_Papers.html (Mar. 12, 2012).*
Fiadjoe, Tsatsu. "Estimating HP-IP Midspan Packing Leakage in Combined Cycles", Journal of Engineering for Gas Turbines and Power, Mar. 2008, vol. 130, Issue 2, 023007-1.*
Haynes, C. J.; Medina, C.A.; Fitzgerald, M.A. (1995), "The measurement of HP-IP leakage flow: the largest source of uncertainty in code tests of lower pressure turbines". PWR-vol. 28, IEE-ASME Joint Power Generation Conference.*
Interim Examination Instructions for Evaluating Subject Matter Eligibility Under 35 U.S.C. 101 (signed Aug. 24, 2009).*
Caudill et al., "Practical Application of Methods to Determine Leakage Between HP and IP Turbines", (date and publication unknown).*

* cited by examiner

*Primary Examiner* — Edward Look
*Assistant Examiner* — Christopher R Legendre
(74) *Attorney, Agent, or Firm* — Fletcher Yoder P.C.

(57) ABSTRACT

In certain embodiments, a system includes a physical computing device having a tangible machine-readable medium including code. The code is adapted to determine an efficiency of a section of a steam turbine based on a relationship between enthalpy difference values and leakage flow rate values between adjacent sections of the steam turbine. The relationship includes a point of equalizing an enthalpy of the leakage and an enthalpy at a destination of the leakage.

19 Claims, 8 Drawing Sheets

SYSTEM AND METHOD FOR MEASURING EFFICIENCY AND LEAKAGE IN A STEAM TURBINE

BACKGROUND OF THE INVENTION

The subject matter disclosed herein relates generally to steam turbines and, more specifically, to measurements of efficiency and leakage in a steam turbine.

A measurement of efficiency of a steam turbine may be used to evaluate whether or not the steam turbine is functioning properly. For example, inlet and outlet measurements may be used to calculate the efficiency for a multi-section steam turbine. Unfortunately, the multiple sections may experience a certain degree of leakage of the working fluid (e.g., steam) between the sections. This leakage may affect the accuracy of directly-measured efficiencies of the multiple steam turbine sections. In particular, the enthalpy of the working fluid leaked between the sections may cause temperatures within the sections to vary from expected ranges.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a physical computing device having a tangible machine-readable medium including code. The code is adapted to determine an efficiency of a section of a steam turbine based on a relationship between enthalpy difference values and leakage flow rate values between adjacent sections of the steam turbine. The relationship includes a point of equalizing an enthalpy of the leakage and an enthalpy at a destination of the leakage.

In a second embodiment, a system includes a physical computing device having a tangible machine-readable medium including code. The code is adapted to establish first, second, and third operating points of a steam turbine by adjusting a temperature at a first inlet into an intermediate-pressure section of the steam turbine. The code is also adapted to calculate first, second, and third enthalpy difference values between the first inlet into the intermediate-pressure section and a second inlet into a high-pressure section of the steam turbine for the first, second, and third operating points, respectively. The code is further adapted to calculate first, second, and third apparent efficiencies of the intermediate-pressure section for the first, second, and third operating points, respectively. In addition, the code is adapted to determine a linear relationship between the first, second, and third enthalpy difference values and the first, second, and third apparent efficiencies for the first, second, and third operating points, respectively. Further, the code is adapted to calculate a true efficiency of the intermediate-pressure section by using the linear relationship and an estimated enthalpy of leakage from the high-pressure section to the intermediate-pressure section.

In a third embodiment, a system includes a steam turbine controller. The steam turbine controller is adapted to (a) establish first, second, and third operating points of a steam turbine by adjusting a temperature at a first inlet into an intermediate-pressure section of the steam turbine. The steam turbine controller is also adapted to (b) calculate first, second, and third enthalpy difference values between the first inlet into the intermediate-pressure section and a second inlet into a high-pressure section of the steam turbine for the first, second, and third operating points, respectively. The steam turbine controller is further adapted to (c) calculate first, second, and third apparent efficiencies of the intermediate-pressure section for the first, second, and third operating points, respectively. In addition, the steam turbine controller is adapted to (d) estimate first, second, and third enthalpies of mid-casing packing leakage from the high-pressure section to the intermediate-pressure section for the first, second, and third operating points, respectively. Further, the steam turbine controller is adapted to (e) calculate first, second, and third mid-casing packing leakage flow rate percentages based at least in part on the first, second, and third enthalpies of mid-casing packing leakage for each of the first, second, and third operating points and an assumed efficiency of the intermediate-pressure section. The steam turbine controller is also adapted to (f) determine a linear relationship between the first, second, and third enthalpy difference values and the first, second, and third mid-casing packing leakage flow rate percentages for the first, second, and third operating points. The steam turbine controller is further adapted to (g) reduce the assumed efficiency of the intermediate-pressure section by a predetermined incremental amount. In addition, the steam turbine controller is adapted to (h) repeat steps (e) through (g) until the linear relationship indicates that the first, second, and third mid-casing packing leakage flow rate percentages are substantially constant between the first, second, and third operating points.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
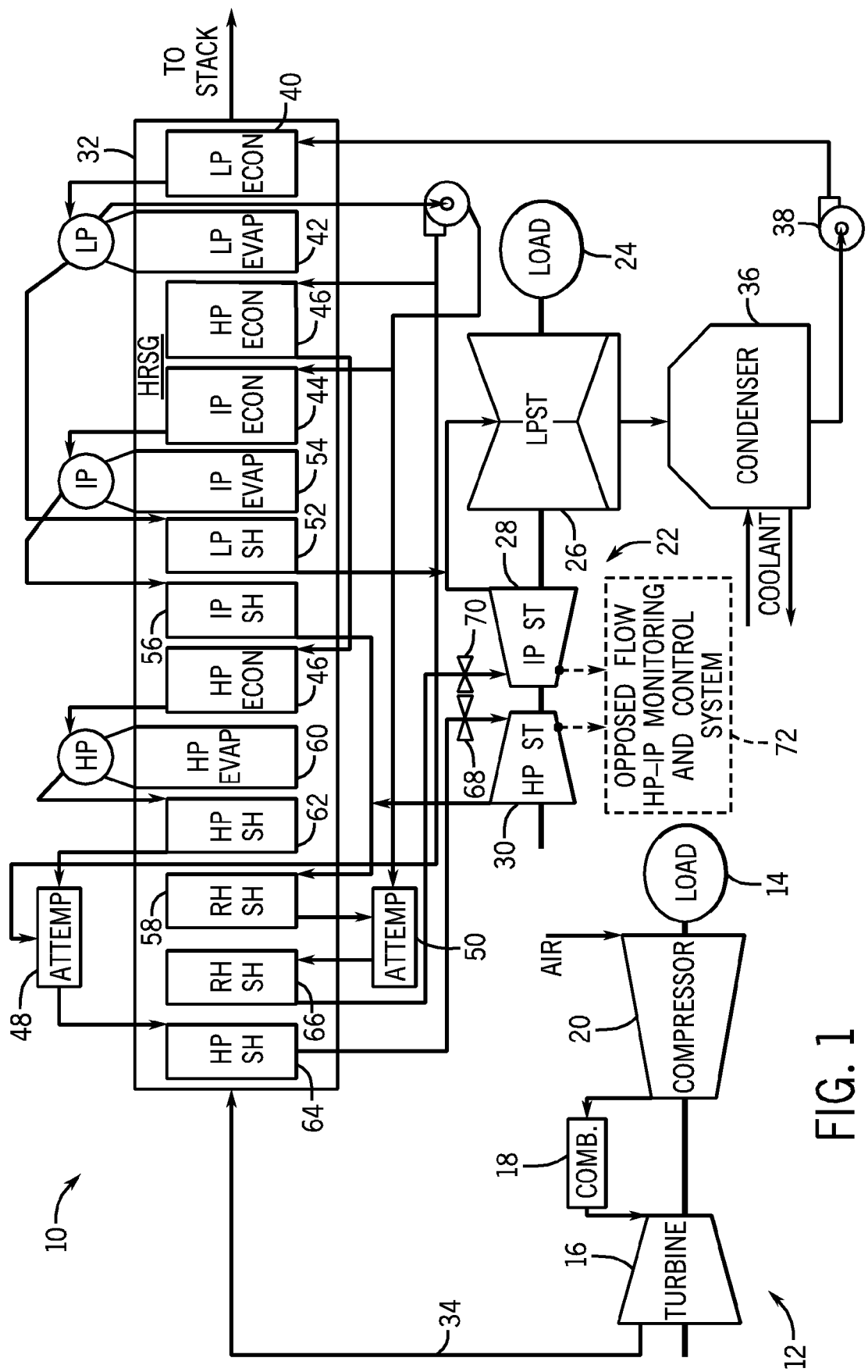
FIG. 1 is a schematic flow diagram of an embodiment of a combined cycle power generation system having a gas turbine, a steam turbine, a heat recovery steam generation (HRSG) system, and an opposed flow HP-IP monitoring and control system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment" or "an embodiment" of the present invention are not intended to be interpreted as excluding the existence of additional embodiments that also incorporate the recited features.

The disclosed embodiments include systems and methods for more accurately measuring the efficiency of an intermediate-pressure (IP) section of an opposed flow steam turbine. In addition, the disclosed embodiments may be used to calculate the internal leakage from a high-pressure (HP) section of the opposed flow steam turbine to the intermediate-pressure section of the opposed flow steam turbine. The disclosed embodiments are particularly well suited for application in an opposed flow HP-IP steam turbine in combined cycle power plants. However, the disclosed embodiments may also be applicable to opposed flow HP-IP steam turbines in fossil fuel plants, as well as other systems employing opposed flow steam turbines.

Measurement of the efficiency of the intermediate-pressure section of the opposed flow HP-IP steam turbine is generally problematic. This is due at least in part to the fact that the flow rate and the enthalpy of the internal leakage from the high-pressure section of the steam turbine to the intermediate-pressure section of the opposed flow HP-IP steam turbine are not generally measured. As such, the true efficiency of the intermediate-pressure section of the steam turbine, accurately accounting for the cooling effect of the internal leakage, generally cannot be directly measured with a validated and calibrated method.

The disclosed embodiments provide for test procedures and calculation methods that enable the true efficiency of the intermediate-pressure section of the steam turbine to be estimated while accurately accounting for the cooling effect of the internal leakage. In addition, the internal leakage may also be determined based on the measured true efficiency of the intermediate-pressure section of the steam turbine. The improved measurement accuracy of the intermediate-pressure steam turbine efficiency and the internal leakage may also enhance the calculation of the low-pressure (LP) steam turbine efficiency. In particular, using the energy balance of the steam turbine and the efficiencies of the high-pressure and intermediate-pressure sections of the steam turbine, the efficiency of the low-pressure section of the steam turbine may be estimated.

FIG. 1 is a schematic flow diagram of an embodiment of a combined cycle power generation system 10 having a gas turbine, a steam turbine, and a heat recovery steam generation (HRSG) system. As described in greater detail below, the system 10 may also include a monitoring and control system configured to calculate, among other things, the efficiency of an intermediate-pressure section of the steam turbine as well as calculating an internal leakage flow rate from a high-pressure section of the steam turbine to the intermediate-pressure section of the steam turbine. However, it should be noted that the disclosed embodiments may also be used for calculating the efficiency and leakage flow rates for other types of turbines having adjacent turbine sections that experience leakage between the sections.

The system 10 may include a gas turbine 12 for driving a first load 14. The first load 14 may, for instance, be an electrical generator for producing electrical power. The gas turbine 12 may include a turbine 16, a combustor or combustion chamber 18, and a compressor 20. The system 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 may also include a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON), a device configured to heat feedwater with gases, which may be used to heat the condensate. From the low-pressure economizer 40, a portion of the condensate may be directed into a low-pressure evaporator 42 (LPEVAP), while the rest may be pumped toward an intermediate-pressure economizer 44 (IPECON), one of two high-pressure economizers (HPECON) 46, or one of two interstage attemperators 48, 50. Steam from the low-pressure evaporator 42 may be directed through a low-pressure superheater 52 (LPSH), where it is superheated and returned to the low-pressure section 26 of the steam turbine 22. From the intermediate-pressure economizer 44, the condensate may be directed into an intermediate-pressure evaporator 54 (IPEVAP). Steam from the intermediate-pressure evaporator 54 may be directed through an intermediate-pressure superheater 56 (IPSH), where it is superheated and sent to a primary re-heating superheater 58 (RHSH).

Condensate from the high-pressure economizers 46 may be directed into a high-pressure evaporator 60 (HPEVAP). Steam exiting the high-pressure evaporator 60 may be directed into a primary high-pressure superheater (HPSH) 62 and a finishing high-pressure superheater 64 (HPSH), where the steam is superheated and eventually sent to the high-pressure section 30 of the steam turbine 22. Exhaust from the high-pressure section 30 of the steam turbine 22 may be directed into the primary re-heating superheater 58 (RHSH) and a secondary re-heating superheater 66 (RHSH), where it may be re-heated before being directed into the intermediate-pressure section 28 of the steam turbine 22. The flow of superheated steam from the finishing high-pressure superheater 64 into the high-pressure section 30 of the steam turbine 22 and the flow of superheated steam from the secondary re-heating superheater 66 into the intermediate-pressure section 28 of the steam turbine 22 may be controlled by a high-pressure control valve 68 and an intermediate-pressure control valve 70, respectively. In addition, exhaust from the intermediate-pressure section 28 of the steam turbine 22 may be directed into the low-pressure section 26 of the steam turbine 22. Again, the connections between the economizers, evaporators, superheaters, and the steam turbine 22 may vary across implementations, as the illustrated embodiment is merely illustrative of the general operation of an HRSG system that may employ unique aspects of the present embodiments.

The first inter-stage attemperator 48 may be located in between the primary high-pressure superheater 62 and the finishing high-pressure superheater 64. The first inter-stage attemperator 48 may allow for more robust control of the exit temperature of steam from the finishing high-pressure superheater 64. Specifically, the first inter-stage attemperator 48 may be configured to control the temperature of steam exiting the finishing high-pressure superheater 64 by injecting cooler feedwater spray into the superheated steam upstream of the finishing high-pressure superheater 64 whenever the temperature of the steam exiting the finishing high-pressure superheater 64 exceeds a predetermined value.

The primary re-heating superheater 58 and secondary re-heating superheater 66 may also be associated with a second inter-stage attemperator 50 for controlling the exit steam temperature from the re-heaters. Specifically, the second inter-stage attemperator 50 may be configured to control the temperature of steam exiting the secondary re-heating superheater 66 by injecting cooler feedwater spray into the superheated steam upstream of the secondary re-heating superheater 66 whenever the temperature of the steam exiting the secondary re-heating superheater 66 exceeds a predetermined value.

In combined cycle systems such as system 10, hot exhaust gas 34 may flow from the gas turbine 12 and pass through the HRSG 32 and may be used to generate high-pressure, high-temperature steam. The steam produced by the HRSG 32 may then be passed through the steam turbine 22 for power generation. In addition, the produced steam may also be supplied to any other processes where superheated steam may be used. The gas turbine 12 cycle is often referred to as the "topping cycle," whereas the steam turbine 22 generation cycle is often referred to as the "bottoming cycle." By combining these two cycles as illustrated in FIG. 1, the combined cycle power generation system 10 may lead to greater efficiencies in both cycles. In particular, exhaust heat from the topping cycle may be captured and used to generate steam for use in the bottoming cycle.

As illustrated in FIG. 1, the high-pressure section 30 and intermediate-pressure section 28 of the steam turbine 22 are arranged in an opposed flow HP-IP configuration. In other words, the inlets into the high-pressure section 30 and the intermediate-pressure section 28 are proximate to each other along a common rotor shaft. As discussed in greater detail below, this type of opposed flow configuration may experience a certain amount of internal leakage from the high-pressure section 30 of the steam turbine 22 to the intermediate-pressure section 28 of the steam turbine 22. As such, in certain embodiments, the steam turbine 22 may include an opposed flow HP-IP monitoring and control system 72. As described in greater detail below, the opposed flow HP-IP monitoring and control system 72 may, among other things, be configured to measure the efficiency of the intermediate-pressure section 28 of the steam turbine 22 as well as calculating the internal leakage flow rate from the high-pressure section 30 of the steam turbine 22 to the intermediate-pressure section 28 of the steam turbine 22.

Figure 2A:
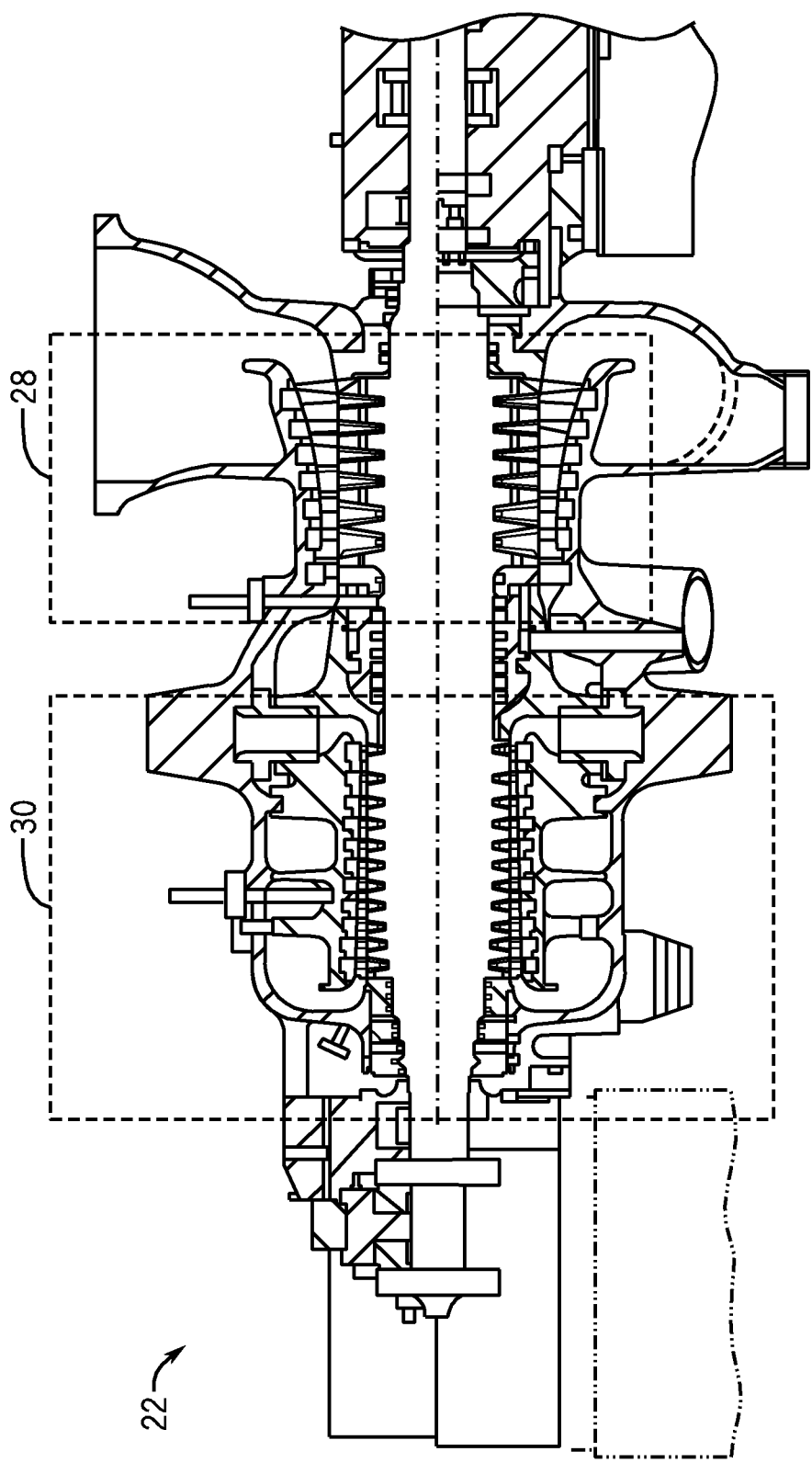
FIGS. 2A and 2B are cross-sectional side views of an exemplary embodiment of the steam turbine having opposed flow high-pressure and intermediate-pressure sections, as illustrated in FIG. 1.
Figure 2B:
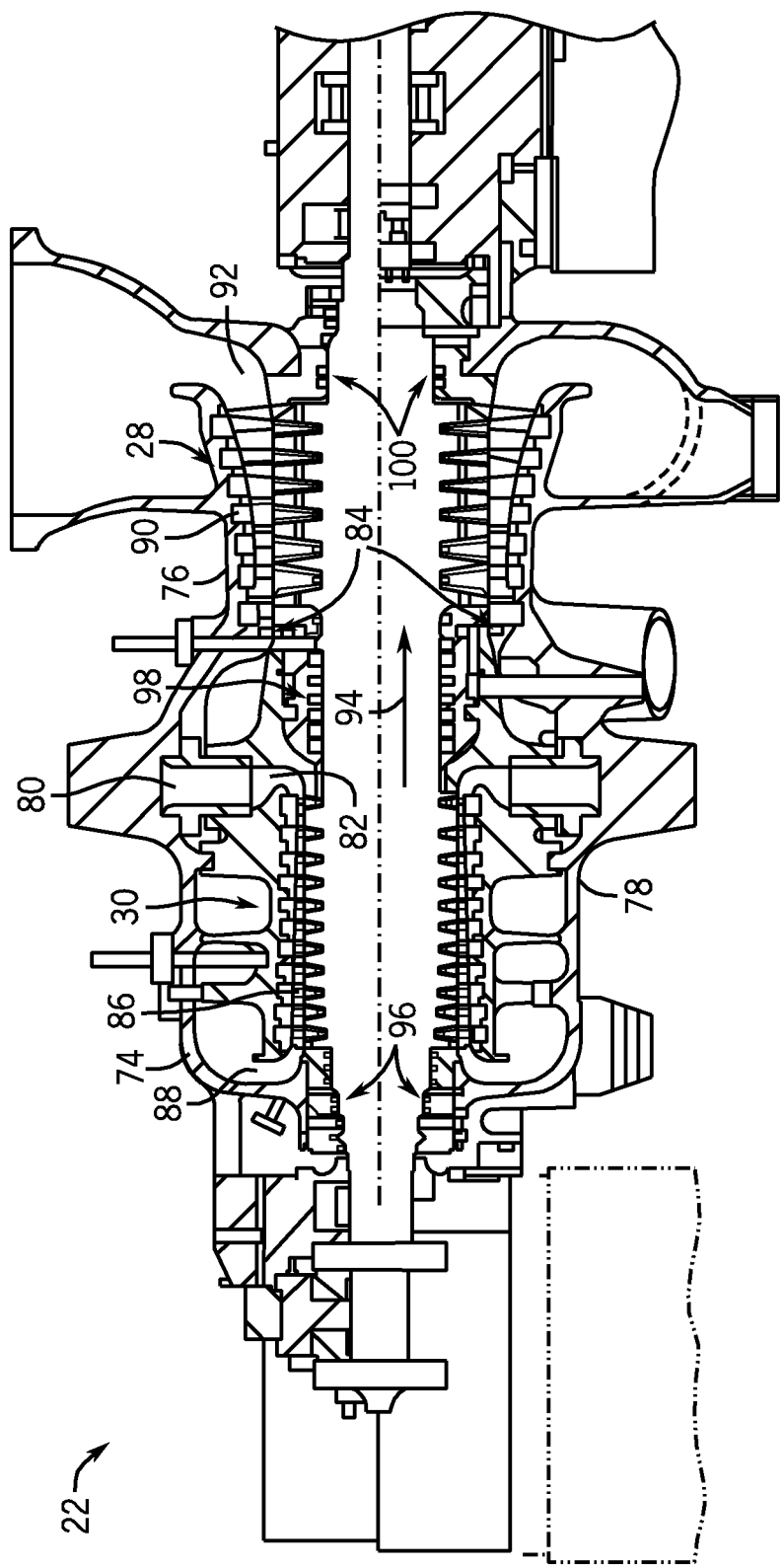

FIGS. 2A and 2B are cross-sectional side views of an exemplary embodiment of the steam turbine 22 having opposed flow high-pressure and intermediate-pressure sections 30, 28, as illustrated in FIG. 1. The steam turbine 22 may include an outer casing 74 which, in certain embodiments, may be divided into an upper half section 76 and a lower half section 78 with both upper and lower half sections 76, 78 extending around both the high-pressure and intermediate-pressure sections 30, 28 of the steam turbine 22. A central section 80 of the outer casing 74 may include a high-pressure steam inlet 82 through which high-pressure steam from the finishing high-pressure superheater 64 of the HRSG 32 may be received by the high-pressure section 30 of the steam turbine 22. Similarly, the central section 80 of the outer casing 74 may also include an intermediate-pressure steam inlet 84 through which intermediate-pressure steam from the secondary re-heating superheater 66 of the HRSG 32 may be received by the intermediate-pressure section 28 of the steam turbine 22.

During operation, the high-pressure steam inlet 82 receives the high-pressure steam from the finishing high-pressure superheater 64 of the HRSG 32 and routes the high-pressure steam through high-pressure turbine stages 86, driving blades which cause rotation of a common rotor shaft of the steam turbine 22. The high-pressure steam exits the high-pressure section 30 of the steam turbine 22 through a high-pressure steam outlet 88. As described above, in certain embodiments, the high-pressure steam may be directed back to the primary re-heating superheater 58 of the HRSG 32 for further superheating and ultimate use in the intermediate-pressure section 28 of the steam turbine 22.

Similarly, the intermediate-pressure steam inlet 84 receives the intermediate-pressure steam from the secondary re-heating superheater 66 of the HRSG 32 and routes the intermediate-pressure steam through intermediate-pressure turbine stages 90, driving blades which cause rotation of the common rotor shaft of the steam turbine 22. The intermediate-pressure steam exits the intermediate-pressure section 28 of the steam turbine 22 through an intermediate-pressure steam outlet 92. As described above, in certain embodiments, the intermediate-pressure steam may be directed into the low-pressure section 26 of the steam turbine 22.

The operating pressure of the high-pressure steam entering through the high-pressure steam inlet 82 may be greater than the operating pressure of the intermediate-pressure steam entering through the intermediate-pressure steam inlet 84. Therefore, as illustrated by arrow 94, the high-pressure steam entering the high-pressure steam inlet 82 may tend to flow toward the intermediate-pressure steam inlet 84 through leakage paths, which may develop between the high-pressure and intermediate sections 30, 28 of the steam turbine 22. This leakage may be referred to as the mid-casing packing leakage 94.

The steam turbine 22 may include several shaft packing locations, which are generally used to minimize such leakage of high-pressure and intermediate-pressure steam from sections of the steam turbine 22. For example, as illustrated in FIGS. 2A and 2B, three such locations may include the high-pressure packing location 96, the mid-casing packing location 98, and the intermediate-pressure packing location 100. In general, the high-pressure packing location 96 is located near the high-pressure steam outlet 88 of the high-pressure section 30 of the steam turbine 22 and may reduce the amount of high-pressure steam leakage from the high-pressure section 30. Similarly, the intermediate-pressure packing location 100 is located near the intermediate-pressure steam outlet 92 of the intermediate-pressure section 28 of the steam turbine 22 and may reduce the amount of intermediate-pressure steam leakage from the intermediate-pressure section 28. However, the mid-casing packing location 98 is of particular interest with respect to the leakage of high-pressure steam from the high-pressure section 30 of the steam turbine 22 to the intermediate-pressure section 28 of the steam turbine 22.

Steam turbine section expansion efficiency in a dry (superheated) region may be easily measured. However, in the opposed flow HP-IP configuration illustrated in FIGS. 2A and 2B, the measurement of the intermediate-pressure steam turbine efficiency is complicated by the mid-casing packing leakage 94, which originates from around the high-pressure steam inlet 82 of the high-pressure section 30 of the steam turbine 22 and flows directly into the intermediate-pressure steam inlet region 84 of the intermediate-pressure section 28 of the steam turbine 22 along the common rotor shaft. This mid-casing packing leakage 94 may generally be much cooler than the heated intermediate-pressure steam, which is received from the secondary re-heating superheater 66 of the HRSG 32. Therefore, when the mid-casing packing leakage 94 mixes with the heated intermediate-pressure steam, it causes the inlet and exit steam within the intermediate-pressure section 28 of the steam turbine 22 to be cooler than otherwise expected. Since the enthalpy and the flow rate of the mid-casing packing leakage 94 may not be directly measured, this cooling effect may not be directly accounted for and the true intermediate-pressure steam turbine efficiency may not be directly measured and calculated.

One method for calculating the intermediate-pressure steam turbine efficiency is based on conditions of the intermediate-pressure steam at the intermediate-pressure steam inlet 84 (e.g., at the inlet of the intermediate-pressure control valve 70 illustrated in FIG. 1) and the intermediate-pressure steam outlet 92 (e.g., at a low-pressure crossover from the intermediate-pressure section 28 of the steam turbine 22 to the low-pressure section 26 of the steam turbine 22). These inlet and outlet conditions may be measured while the low-pressure steam flow is diverted to the condenser 36 of FIG. 1. The mid-casing packing leakage 94 flow rate may be estimated using a "temperature inference method," which is based upon the cooling effect the mid-casing packing leakage 94 has on the apparent intermediate-pressure steam turbine efficiency. More specifically, as discussed in detail below, the flow rate of the mid-casing packing leakage 94 may be measured indirectly by changing the initial and re-heat temperatures and calculating the flow rate which best fits the test data.

As described above, high-pressure steam leaking from the high-pressure section 30 to the intermediate-pressure section 28 cools the intermediate-pressure steam in the intermediate-pressure section 28, which may yield an erroneously high value of measured intermediate-pressure steam turbine efficiency if not properly compensated. In general, the degree of this error may vary in proportion to the difference in enthalpy between the mid-casing packing leakage 94 and the intermediate-pressure steam received from the secondary re-heating superheater 66 of the HRSG 32 at the intermediate-pressure steam inlet 84. Therefore, it follows that as the temperature of the high-pressure steam into the high-pressure steam inlet 82, commonly referred to as the "main steam" (MS), is raised and/or the temperature of the intermediate-pressure steam (e.g., "hot re-heat" (HRH) steam") into the intermediate-pressure steam inlet 84 is decreased, this error will decrease. Conversely, as the temperature of the main steam is decreased and/or the temperature of the hot re-heat steam is raised, this error will increase. The temperature inference method utilizes this relationship between the main steam and hot re-heat steam to derive the mid-casing packing leakage 94 flow rate.

Figure 3:
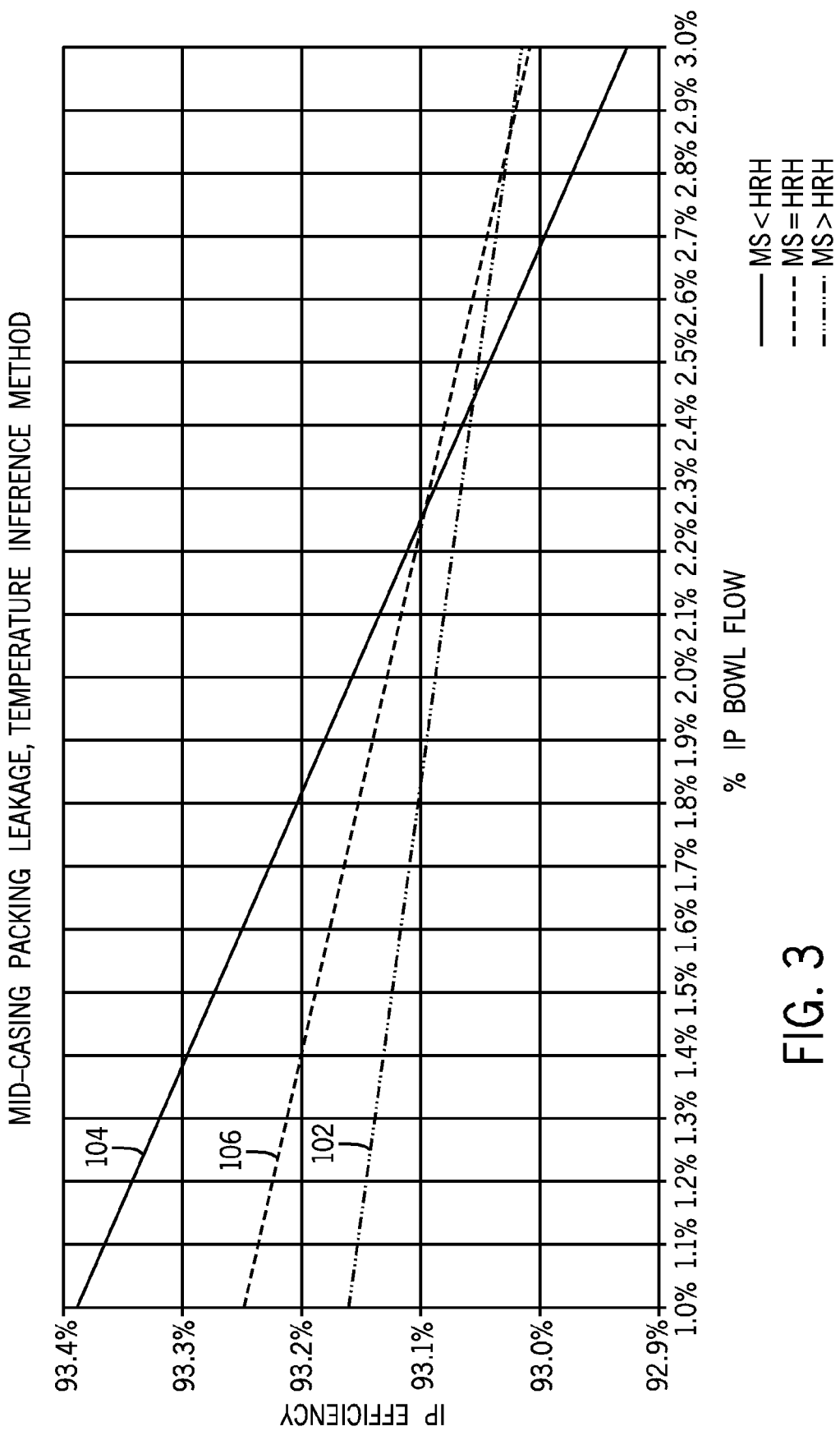
FIG. 3 is a chart of test data and calculations used in a temperature inference method in accordance with an embodiment of the opposed flow HP-IP monitoring and control system, as illustrated in FIG. 1.

FIG. 3 is a chart of test data and calculations used with a temperature inference method in accordance with an embodiment of the opposed flow HP-IP monitoring and control system 72, as illustrated in FIG. 1. For the temperature inference method, three testing states are established. In other words, the operating conditions of the high-pressure and intermediate-pressure sections 30, 28 of the steam turbine 22 are adjusted to three separate testing states. For each of the three testing states, a series of data points are collected which correlate the assumed mid-casing packing leakage 94 with the efficiency of the intermediate-pressure section 28 of the steam turbine 22, as illustrated by FIG. 3. For example, as illustrated by line 102, the first testing state corresponds to a testing state where the temperature of the main steam (MS) is approximately equal to the temperature of the hot re-heat (HRH) steam. Next, as illustrated by line 104, the second testing state corresponds to a testing state where the temperature of the main steam (MS) is less than the temperature of the hot re-heat (HRH) steam by a pre-determined amount (e.g., 30° F.). Finally, as illustrated by line 106, the third testing state corresponds to a testing state where the temperature of the main steam (MS) is greater than the temperature of the hot re-heat (HRH) steam by a pre-determined amount (e.g., 30° F.). The pre-determined temperature difference of 30° F. is merely exemplary and is not intended to be limiting. For example, this value may be implementation-specific and may vary between approximately 10° F., 20° F., 30° F., 40° F., 50° F., 60° F., 70° F., 80° F., 90° F., 100° F., or any other discrete temperature difference value that may lead to acceptable results.

For each testing state, the steam conditions for the main steam, the hot re-heat steam, and the high-pressure steam turbine exhaust at the high-pressure steam outlet 88 are measured. Based on these measured steam conditions, the enthalpy of the mid-casing packing leakage 94 may be estimated for each testing state using heat balance or expansion line calculation. Next, for each testing state, an assumed mid-casing packing leakage 94 flow rate may be used to calculate the enthalpy of the intermediate-pressure steam (e.g., "hot re-heat" (HRH) steam") at the intermediate-pressure steam inlet 84, commonly referred to as the "IP bowl." In addition, the efficiency of the intermediate-section 28 of the steam turbine 22 may also be calculated for each assumed mid-casing packing leakage 94 flow rate.

In particular, the assumed mid-casing packing leakage 94 flow rate may be incremented as a percentage of the IP bowl flow rate. For example, for each testing state, the percentage of the assumed mid-casing packing leakage 94 flow rate to the IP bowl flow rate may be increased from 0.0% to 5.0% in increments of 0.1%. However, these values may vary depending on the particular steam turbine 22 being tested. For each increment of assumed mid-casing packing leakage 94 flow rate, the IP bowl enthalpy (Enthalpy$_{IPbowl}$) may be calculated using the equation:

Enthalpy$_{IPbowl}$=Enthalpy$_{HRH}$−%FlowRate$_{Leakage}$(Enthalpy$_{HRH}$−Enthalpy$_{Leakage}$)

where Enthalpy$_{HRH}$ is the enthalpy of the hot re-heat steam, Enthalpy$_{Leakage}$ is the estimated enthalpy of the mid-casing packing leakage 94, and % FlowRate$_{Leakage}$ is the assumed steam flow rate of the mid-casing packing leakage 94 as a percentage of the IP bowl steam flow rate. Then, for each increment of assumed mid-casing packing leakage 94 flow rate and associated IP bowl enthalpy calculation, an efficiency (Efficiency$_{IP}$) for the intermediate-pressure section 28 of the steam turbine 22 may be calculated using the equation:

$$Efficiency_{IP} = \frac{Enthalpy_{IPbowl} - Enthalpy_{IPexhaust}}{Enthalpy_{IPbowl} - Enthalpy_{IPexhaust@Isentropic}}$$

where Enthalpy$_{IPexhaust}$ is the enthalpy at the intermediate-pressure steam outlet 92 and Enthalpy$_{IPexhaust@Isentropic}$ is the enthalpy at the intermediate-pressure steam outlet 92 assuming isentropic expansion. Using these calculated values for the efficiency of the intermediate-pressure section 28 of the steam turbine 22 for each increment of assumed mid-casing packing leakage 94 flow rate for each testing state, lines 102, 104, 106 may be plotted, as illustrated by FIG. 3. In theory, a point at which all three of the plotted lines 102, 104, 106 intersect will yield the true efficiency of the intermediate-pressure section 28 of the steam turbine 22 as well as the mid-casing packing leakage 94 flow rate as a percentage of the IP bowl flow rate. For example, in the chart illustrated in FIG. 3, the true efficiency of the intermediate-pressure section 28 of the steam turbine 22 will be approximately 93.1% and the mid-casing packing leakage 94 flow rate as a percentage of the IP bowl flow rate will be approximately 2.3%.

Figure 4:
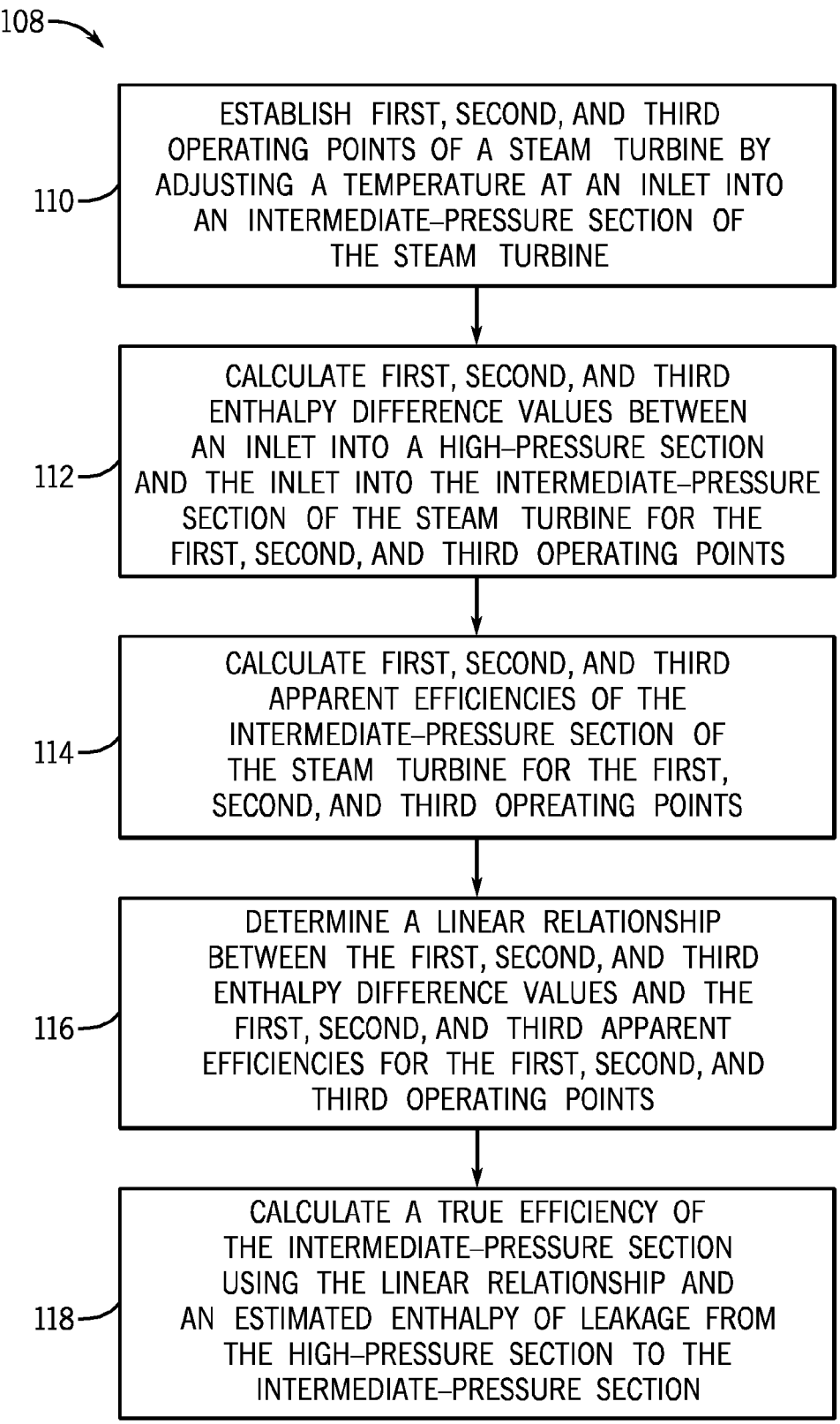
FIG. 4 is a flow chart of an embodiment of a method for determining the efficiency of the intermediate-pressure section of the steam turbine.

However, the temperature inference method may not be the only method for calculating the efficiency of the intermediate-pressure section 28 of the steam turbine 22 and the mid-casing packing leakage 94 flow rate. For example, FIG. 4 is a flow chart of an embodiment of a method 108 for determining the efficiency of the intermediate-pressure section 28 of the steam turbine 22. Before discussing the method 108 in detail, the general testing principles will be described.

As with the temperature inference method, the method 108 of FIG. 4 will also involve three separate testing states. In general, all of the measurements and calculations relating to the three individual test states should be conducted after a certain time period of stabilization of the steam conditions in the steam turbine 22. For example, in certain embodiments, a stabilization time period of approximately 30 minutes may be used. However, in other embodiments, different stabilization time periods may be used. In general, recommended stabilization time periods may depend on implementation-specific conditions and may vary between, for instance, approximately 30 minutes, 40 minutes, 50 minutes, an hour, or any other time period leading to acceptable results. The primary reason for the stabilization time period is to ensure that the steam temperatures, pressures, and flow rates of the steam turbine 22 remain relatively stable and constant for the duration of the testing. All the valves should be in a fixed, wide-open position, which may generally be the most common operating condition for the combined cycle power generation system 10. Although cycle isolation may not be required for these test runs, the low-pressure steam flow may be diverted to the condenser 36 via a low-pressure bypass line to avoid additional mixing of the intermediate-pressure exhaust flow and the low-pressure inlet flow, which might further complicate the calculation of the intermediate-pressure steam turbine efficiency. In addition, the gas turbine 12 may generally be operated at a constant load for the duration of the test runs, further stabilizing the combined cycle power generation system 10.

Similar to the temperature inference method, the steam turbine 22 will be operated at three separate testing states which may, in certain embodiments, be performed in the field. In general, the steam turbine 22 will be operated at or near base loads at different combinations of inlet temperatures to the high-pressure and intermediate-pressure sections 30, 28 of the steam turbine 22. In other words, the temperature of the main steam and the hot re-heat steam will be varied relative to each other. More specifically, in Test 1, the main steam and the hot re-heat steam will be held at substantially similar temperatures, such as at their rated conditions. For example, in certain embodiments, the main steam and the hot re-heat steam may be held at approximately 1050° F. However, this temperature may vary between systems and may include approximately 900° F., 950° F., 1000° F., 1050° F., 1100° F., or any other discrete temperature that leads to acceptable results. Next, in Test 2, the hot re-heat temperature may be lowered a pre-determined amount while holding the main steam temperature relatively constant. For example, in certain embodiments, the temperature of the hot re-heat steam may be reduced by approximately 30° F. However, this temperature reduction may vary and may include approximately 10° F., 20° F., 30° F., 40° F., 50° F., 60° F., 70° F., 80° F., 90° F., 100° F., or any other discrete temperature reduction which leads to acceptable results. Finally, in Test 3, the main steam temperature will again be held constant while the temperature of the hot re-heat steam is further reduced and stabilized to a point where the calculated enthalpy of the hot re-heat steam is approximately equal to the calculated enthalpy of the main steam. Therefore, this amount of additional temperature reduction will depend on calculations based on, for example, steam tables. In general, in certain embodiments, the temperature variations of the hot re-heat steam may be achieved by adjusting the re-heat attemperation at the second interstage attemperator 50, illustrated in FIG. 1.

The cooling effect on the intermediate-pressure steam turbine efficiency from the mid-casing packing leakage 94 may generally be the largest in Test 1, where the main steam and the hot re-heat steam are at generally similar temperatures. As the hot re-heat temperature drops and the main steam temperature remains relatively constant, the cooling effect on the intermediate-pressure steam turbine efficiency decreases since the enthalpy difference between the main steam and hot re-heat steam decreases, as in Test 2. In Test 3, when the enthalpy of the hot re-heat steam is approximately equal to the enthalpy of the main steam, the cooling effect will generally be very small. The minimum cooling effect that Test 3 achieves brings the "apparent" intermediate-pressure steam turbine efficiency very close to the "true" intermediate-pressure steam turbine efficiency.

However, since the enthalpy of the mid-casing packing leakage 94 cannot be directly measured, it is generally not possible to completely eliminate the cooling effect and therefore, directly measure the "true" intermediate-pressure steam turbine efficiency by bringing the enthalpy of the hot re-heat steam below the enthalpy of the main steam in an attempt to match the mid-casing packing leakage 94, whose enthalpy is most likely lower than the identical enthalpies of the main steam and the hot re-heat steam in Test 3. Although the measured "apparent" intermediate-pressure steam turbine efficiency is very close to the "true" intermediate-pressure steam turbine efficiency in Test 3, a linear relationship derived from the three tests may be used to calculate the "true" intermediate-pressure steam turbine efficiency. The following steps describe the calculation methodology for determining the "true" intermediate-pressure steam turbine efficiency from the test data.

In step 110, first, second, and third operating points may be established for the steam turbine 22 by adjusting the temperature of the intermediate-pressure steam at the intermediate-pressure steam inlet 84. As described above, in certain embodiments, adjusting the temperature of the intermediate-pressure steam at the intermediate-pressure steam inlet 84 may be achieved by adjusting the re-heat attemperation at the second inter-stage attemperator 50, illustrated in FIG. 1. The first, second, and third operating points correlate to Test 1, Test 2, and Test 3, respectively. In particular, the first operating point may be established by adjusting the temperature of the high-pressure steam (e.g., the main steam) at the high-pressure steam inlet 82 and the temperature of the intermediate-pressure steam (e.g., the hot re-heat steam) at the intermediate-pressure steam inlet 84 such that the two temperatures are approximately equal. Next, the second operating point may be established by reducing the temperature of the hot re-heat steam at the intermediate-pressure steam inlet 84 by a pre-determined amount. Finally, the third operating point may be established by further reducing the temperature of the hot re-heat steam at the intermediate-pressure steam inlet 84 to a point where the calculated enthalpy of the main steam at the high-pressure steam inlet 82 is approximately equal to the calculated enthalpy of the hot re-heat steam at the intermediate-pressure steam inlet 84.

In step 112, first, second, and third enthalpy difference values may be calculated between the main steam at the high-pressure steam inlet 82 and the hot re-heat steam at the intermediate-pressure steam inlet 84 for the first, second, and third operating points, respectively. In step 114, first, second, and third "apparent" efficiencies of the intermediate-pressure section 28 of the steam turbine 22 may be calculated corresponding to the first, second, and third operating points, respectively. In step 116, a linear relationship may be determined between the first, second, and third enthalpy difference values calculated in step 112 and the first, second, and third "apparent" efficiencies calculated in step 114 for the first, second, and third operating points, respectively.

In step 118, the "true" efficiency of the intermediate-pressure section 28 of the steam turbine 22 may be calculated using the linear relationship determined in step 116 and an estimated enthalpy of the mid-casing packing leakage 94. The enthalpy of the mid-casing packing leakage 94 may be estimated for the third operating point using an enthalpy-drop expansion line based on the test data and/or a manufacturer's estimating method for the steam turbine 22. In certain embodiments, a fourth enthalpy difference value between the main steam at the high-pressure steam inlet 82 and the hot re-heat steam at the intermediate-pressure steam inlet 84 may be estimated based on the difference between the enthalpy of the main steam at the high-pressure steam inlet 82 at the third operating point, and the estimated enthalpy of the mid-casing packing leakage 94 as the enthalpy of the hot re-heat steam at the intermediate-pressure steam inlet 84. Then, the "true" efficiency of the intermediate-pressure section 28 of the steam turbine 22 may be predicted based on the linear relationship determined in step 116 and the fourth enthalpy difference value. In other words, the third operating point (e.g., Test 3) plotted in the linear relationship may be offset by the fourth enthalpy difference value and the corresponding "apparent" intermediate-pressure steam turbine efficiency on the linear relationship will correlate to the "true" intermediate-pressure steam turbine efficiency. The linear relationship includes a point where the enthalpy of the mid-casing packing leakage 94 is equalized with the enthalpy at the destination of the mid-casing packing leakage 94 (e.g., the intermediate-pressure steam inlet 84).

Figure 5:
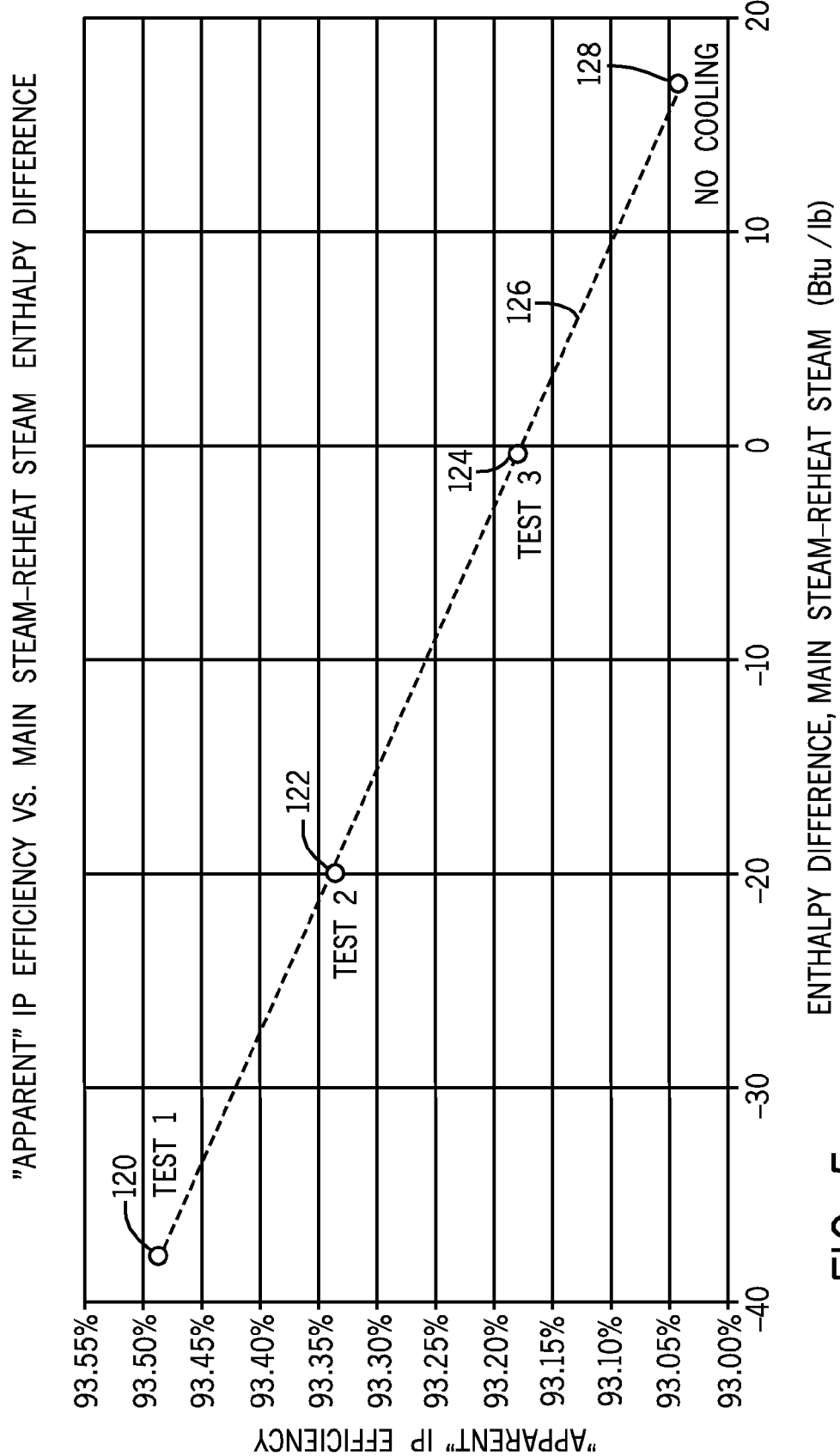
FIG. 5 is a chart of first, second, an third operating points for the steam turbine and a fourth estimated operating point for the steam turbine corresponding to a "no cooling" scenario in accordance with an embodiment of the opposed flow HP-IP monitoring and control system, as illustrated in FIG. 1.

For example, FIG. 5 is a chart of the first, second, and third operating points for the steam turbine 22 and a fourth estimated operating point for the steam turbine 22 corresponding to a "no cooling" scenario, where the enthalpy of the mid-casing packing leakage 94 approximately equals the enthalpy of the hot re-heat steam, in accordance with an embodiment of the opposed flow HP-IP monitoring and control system 72, as illustrated in FIG. 1. As illustrated, first, second, and third operating points 120, 122, 124 (e.g., corresponding to Test 1, Test 2, and Test 3, respectively) are plotted with the first, second, and third enthalpy difference values calculated in step 112 of FIG. 4 versus the first, second, and third "apparent" efficiencies of the intermediate-pressure section 28 calculated in step 114 of FIG. 4. As illustrated, the linear relationship 126 determined in step 116 of FIG. 4 generally extends through the first, second, and third operating points. From the third operating point 124, a fourth estimated operating point 128 corresponding to the "no cooling" scenario may be predicted by offsetting the third operating point 124 by the estimated enthalpy of the mid-casing packing leakage 94, described above. The "apparent" efficiency at the fourth estimated operating point 128 may generally approximate the "true" efficiency of the intermediate-pressure section 28 of the steam turbine 22, since the mid-casing packing leakage does not cool the steam at the inlet to the intermediate-pressure section 28.

Figure 6:
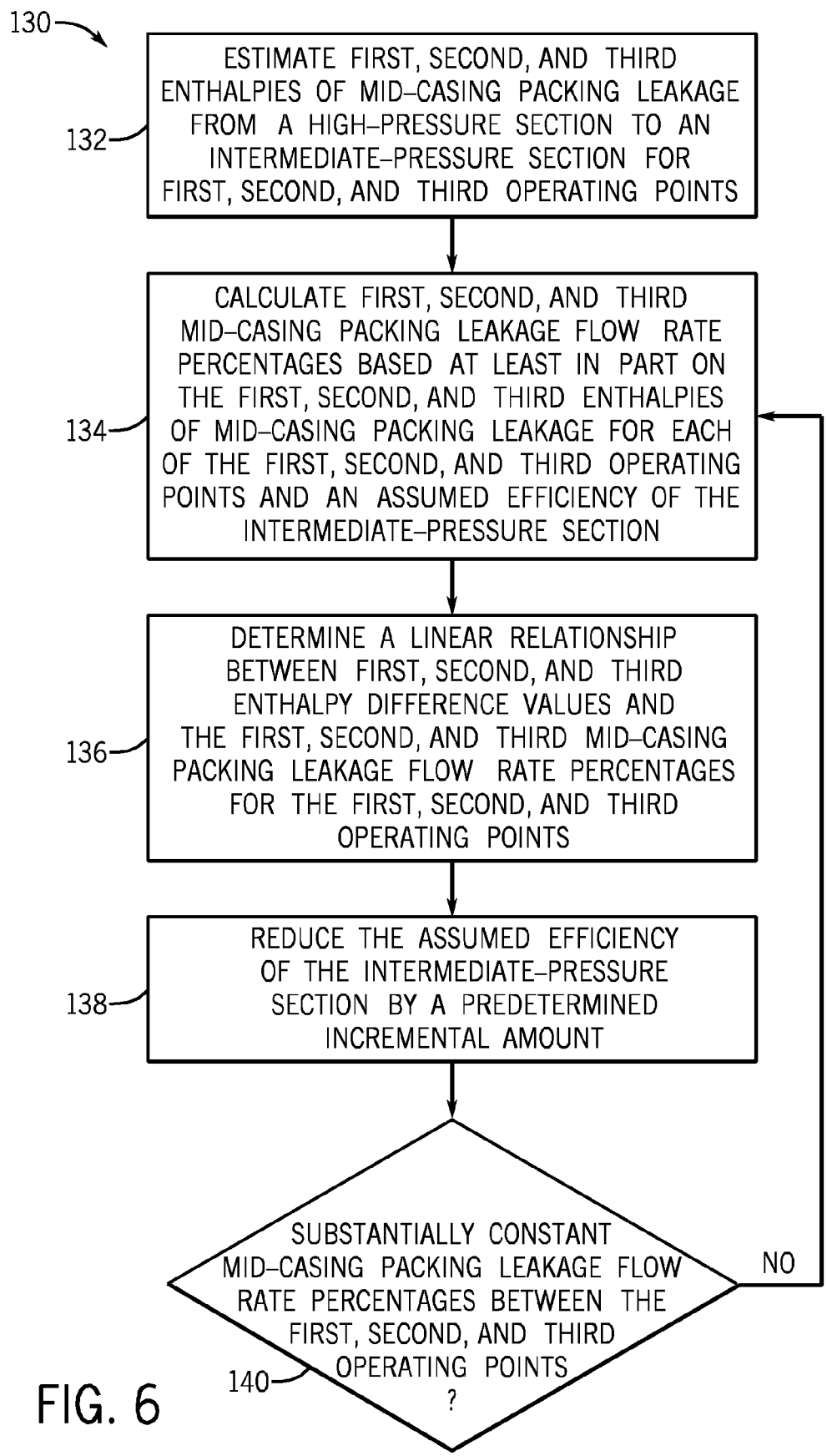
FIG. 6 is a flow chart of an embodiment of a method for determining the flow rate of mid-casing packing leakage between the high-pressure and intermediate-pressure sections of the steam turbine.

The method 108 described in FIGS. 4 and 5 for estimating the intermediate-pressure steam turbine efficiency is not the only method available using the disclosed techniques. For example, FIG. 6 is a flow chart of an embodiment of a method 130 for determining the flow rate of the mid-casing packing leakage 94 between the high-pressure and intermediate-pressure sections 30, 28 of the steam turbine 22. To a certain degree, the method 130 illustrated in FIG. 6 is a continuation of the method 108 illustrated in FIG. 4. More specifically, in certain embodiments, with the "true" intermediate-pressure steam turbine efficiency established using the method 108 of FIG. 4, the flow rate of the mid-casing packing leakage 94 may be solved for each of the test runs (e.g., Test 1, Test 2, and Test 3) using the estimated enthalpy of the mid-casing packing leakage 94 and the measured high-pressure and intermediate-pressure steam turbine efficiencies.

In addition, the characterization of the mid-casing packing leakage 94 flow rate as a near constant percentage of the main steam flow rate may further be utilized as an alternative method for determining the "true" intermediate-pressure steam turbine efficiency. However, the mid-casing packing leakage 94 should not be assumed to be a constant percentage of the hot re-heat steam flow rate because variations in the re-heat attemperation at the second inter-stage attemperator 50 may cause variations in the intermediate-pressure steam flow production from the HRSG 32. Therefore, the relationship between the mid-casing packing leakage 94 flow rate and the hot re-heat steam flow rate may change as well.

Therefore, the method 130 illustrated in FIG. 6 is based on a few assumptions. First, since the intermediate-pressure section 28 is a relatively constant volume flow section, the intermediate-pressure steam turbine efficiency remains generally constant for the three test runs (e.g., Test 1, Test 2, and Test 3). Second, the mid-casing packing leakage 94 flow rate remains at a generally constant percentage of the main steam flow rate. The following steps describe the calculation methodology for determining the mid-casing packing leakage flow rate 94 and alternative calculations of intermediate-pressure steam turbine efficiency. As described above, certain steps of the method 108 illustrated in FIG. 4 may be used with the method 130 of FIG. 6. For example, steps 110, 112, and 114 illustrated in FIG. 4 may prove particularly beneficial.

In step 132 of the method 130 of FIG. 6, first, second, and third enthalpies of the mid-casing packing leakage 94 may be estimated for the first, second, and third operating points (e.g., Test 1, Test 2, and Test 3). In certain embodiments, the first, second, and third enthalpies of the mid-casing packing leakage 94 may be estimated using an enthalpy-drop expansion line based on the test data and/or a manufacturer's estimating method for the steam turbine 22. In step 134, first, second, and third mid-casing packing leakage 94 flow rate percentages may be calculated based at least in part on the first, second, and third enthalpies of mid-casing packing leakage 94 for each of the first, second, and third operating points. The first, second, and third mid-casing packing leakage 94 flow rate percentages may also be calculated based on an "assumed" efficiency of the intermediate-pressure section 28 of the steam turbine 22. The mid-casing packing leakage 94 flow rate percentages may equate to the mid-casing packing leakage 94 flow rate values divided by the flow rate of the main steam. In certain embodiments, an initial value for the "assumed" efficiency of the intermediate-pressure section 28 may be selected as the third apparent efficiency for the third operating point, as calculated in step 114 of the method 108 illustrated in FIG. 4. The third apparent efficiency may be adjusted based on an estimated enthalpy of the mid-casing packing leakage 94, for example, as estimated in step 132 of method 130. More specifically, the third apparent efficiency may be adjusted based on the estimated third enthalpy of the mid-casing packing leakage 94 corresponding to the third operating point.

In step 136, a linear relationship between first, second, and third enthalpy difference values (e.g., as calculated in step 112 of the method 108 illustrated in FIG. 4) and the first, second, and third mid-casing packing leakage 94 flow rate percentages (e.g., as calculated in step 134 of the method 130 illustrated in FIG. 6) may be determined for the first, second, and third operating points. In step 138, the "assumed" efficiency of the intermediate-pressure section 28 of the steam turbine 22 may be reduced by a predetermined incremental amount. For example, in certain embodiments, the predetermined incremental amount may be approximately 0.1%. However, in other embodiments, the predetermined incremental amount may be approximately 0.01%, 0.02%, 0.05%, 0.1%, 0.15%, 0.2%, or any other discrete percentage amount which leads to acceptable results. In step 140, a determination may be made as to whether the first, second, and third mid-casing packing leakage 94 flow rate percentages between the first, second, and third operating points are substantially constant. If the first, second, and third mid-casing packing leakage 94 flow rate percentages are not substantially constant, steps 134, 136, and 138 of the method 130 may be repeated until the first, second, and third mid-casing packing leakage 94 flow rate percentages are substantially constant.

Figure 7:
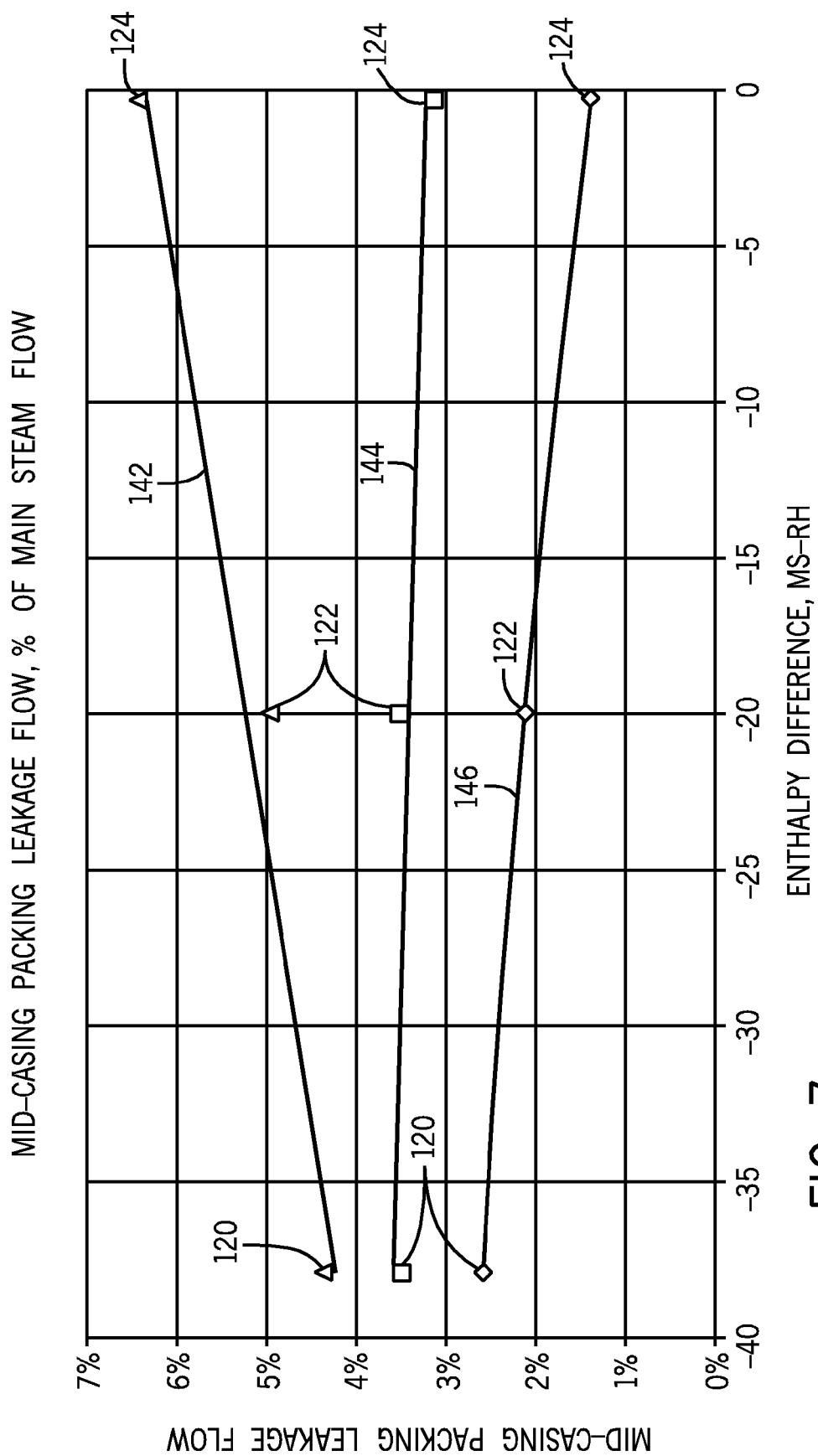
FIG. 7 is a chart of first, second, and third operating points for the steam turbine based on three "assumed" efficiency values in accordance with an embodiment of the opposed flow HP-IP monitoring and control system, as illustrated in FIG. 1.

For example, FIG. 7 is a chart of the first, second, and third operating points for the steam turbine 22 based on three "assumed" efficiency values in accordance with an embodiment of the opposed flow HP-IP monitoring and control system 72, as illustrated in FIG. 1. For example, first, second, and third operating points 120, 122, 124 (e.g., corresponding to Test 1, Test 2, and Test 3, respectively) are plotted for three separate values of "assumed" efficiency, for example, a first "assumed" efficiency 142, a second "assumed" efficiency 144, and a third "assumed" efficiency 146. As discussed above, the first "assumed" efficiency 142 may be greater than the second "assumed" efficiency 144 by a predetermined incremental amount while the second "assumed" efficiency 144 may also be greater than the third "assumed" efficiency 146 by the predetermined incremental amount. As illustrated, the linear relationship relating to the second "assumed" efficiency leads to a situation where the first, second, and third mid-casing packing leakage 94 flow rate percentages between the first, second, and third operating points 120, 122, and 124 are substantially constant (e.g., having a substantially horizontal slope). Therefore, the second "assumed" efficiency 144 may be approximately equal to the "true" efficiency of the intermediate-pressure section 28 of the steam turbine 22 and the related values for the first, second, and third mid-casing packing leakage 94 flow rate percentages may be approximately equal to the actual mid-casing packing leakage 94 flow rate as a percentage of the main steam flow rate.

Technical effects of the disclosed embodiments include providing systems and methods for estimating the efficiency of the intermediate-pressure section 28 of the steam turbine 22 and the flow rate of mid-casing packing leakage 94 between the high-pressure section 30 and the intermediate-pressure section 28 of the steam turbine 22. As described above, in certain embodiments, the methods 108 and 130 illustrated in FIGS. 4 and 6 may be performed by the opposed flow HP-IP monitoring and control system 72 illustrated in FIG. 1 above. The opposed flow HP-IP monitoring and control system 72 may, in certain embodiments, include a memory device and a machine-readable medium with instructions encoded thereon for estimating the efficiency of the intermediate-pressure section 28 of the steam turbine 22 and the flow rate of mid-casing packing leakage 94 between the high-pressure section 30 and the intermediate-pressure section 28 of the steam turbine 22. As such, the methods 108, 130 described above may be computer-implemented using the opposed flow HP-IP monitoring and control system 72.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a physical computing device having a tangible machine-readable medium comprising code that, when in operation:
   determines an efficiency of a section of a steam turbine based on a relationship between enthalpy difference values and leakage flow rate values between adjacent sections of the steam turbine, wherein the relationship includes a point of relating an enthalpy of the leakage and an enthalpy at a destination of the leakage, wherein the point of relating the enthalpy of the leakage and the enthalpy at the destination of the leakage is achieved by adjusting a temperature of at least one of the adjacent sections of the steam turbine;

calculates a plurality of enthalpy difference values between a first inlet into an intermediate-pressure section of the steam turbine and a second inlet into a high-pressure section of the steam turbine for a plurality of operating points of the steam turbine;

calculates a plurality of mid-casing packing leakage flow rate percentages based at least in part on a plurality of mid-casing packing leakage enthalpies for the plurality of operating points and an assumed efficiency of the intermediate-pressure section; and determines a true efficiency of the intermediate-pressure section based on a relationship between the plurality of enthalpy difference values and the plurality of mid-casing packing leakage flow rate percentages.

2. The system of claim 1, wherein the relationship is obtained in the field via a testing method.

3. The system of claim 1, wherein the mid-casing packing leakage flow rate percentages comprise percentages of mid-casing packing leakage flow rate values compared to flow rates of steam into the second inlet into the high-pressure section.

4. The system of claim 1, wherein the code, when in operation:
  (a) estimates a plurality of enthalpies of mid-casing packing leakage from the high-pressure section to the intermediate-pressure section for the plurality of operating points;
  (b) re-calculates the plurality of mid-casing packing leakage flow rate percentages based at least in part on the plurality of enthalpies of mid-casing packing leakage for each of the plurality of operating points and the assumed efficiency of the intermediate-pressure section;
  (c) determines a linear relationship between the plurality of enthalpy difference values and the plurality of mid-casing packing leakage flow rate percentages for the plurality of operating points;
  (d) reduces the assumed efficiency of the intermediate-pressure section by a predetermined incremental amount; and
  (e) repeats steps (b) through (d) until the linear relationship indicates that the plurality of mid-casing packing leakage flow rate percentages are substantially constant between the plurality of operating points.

5. The system of claim 4, wherein the assumed efficiency is approximately equal to a true efficiency of the intermediate-pressure section when the linear relationship indicates the plurality of mid-casing packing leakage flow rate percentages are substantially constant between the plurality of operating points.

6. The system of claim 4, wherein the plurality of mid-casing packing leakage flow rate percentages are approximately equal to an actual mid-casing packing leakage flow rate percentage when the linear relationship indicates the plurality of mid-casing packing leakage flow rate percentages are substantially constant between the plurality of operating points.

7. A system, comprising:
a physical computing device having a tangible machine-readable medium comprising code that, when in operation:
  establishes first, second, and third operating points of a steam turbine by adjusting a temperature at a first inlet into an intermediate-pressure section of the steam turbine;
  calculates first, second, and third enthalpy difference values between the first inlet into the intermediate-pressure section and a second inlet into a high-pressure section of the steam turbine for the first, second, and third operating points, respectively;
  calculates first, second, and third apparent efficiencies of the intermediate-pressure section for the first, second, and third operating points, respectively;
  determines a linear relationship between the first, second, and third enthalpy difference values and the first, second, and third apparent efficiencies for the first, second, and third operating points, respectively; and
  calculates a true efficiency of the intermediate-pressure section by using the linear relationship and an estimated enthalpy of leakage from the high-pressure section to the intermediate-pressure section.

8. The system of claim 7, wherein the third operating point is an operating point where a first calculated enthalpy at the first inlet into the intermediate-pressure section is approximately equal to a second calculated enthalpy at the second inlet into the high-pressure section.

9. The system of claim 7, wherein the code, when in operation, controls an inter-stage attemperator of a heat recovery steam generation system.

10. The system of claim 7, wherein the code, when in operation, adjusts the third apparent efficiency by an offset value of the linear relationship corresponding to the estimated enthalpy of leakage from the high-pressure section to the intermediate-pressure section.

11. The system of claim 7, wherein the code, when in operation, determines the estimated enthalpy of leakage from the high-pressure section to the intermediate-pressure section using an enthalpy-drop expansion line based on test data and/or a steam turbine manufacturer's estimating method.

12. The system of claim 7, wherein the code, when in operation, calculates the true efficiency of an intermediate-pressure section of an opposed flow steam turbine.

13. A system, comprising:
a steam turbine controller that, when in operation:
  (a) establishes first, second, and third operating points of a steam turbine by adjusting a temperature at a first inlet into an intermediate-pressure section of the steam turbine;
  (b) calculates first, second, and third enthalpy difference values between the first inlet into the intermediate-pressure section and a second inlet into a high-pressure section of the steam turbine for the first, second, and third operating points, respectively;
  (c) calculates first, second, and third apparent efficiencies of the intermediate-pressure section for the first, second, and third operating points, respectively;
  (d) estimates first, second, and third enthalpies of mid-casing packing leakage from the high-pressure section to the intermediate-pressure section for the first, second, and third operating points, respectively;
  (e) calculates first, second, and third mid-casing packing leakage flow rate percentages based at least in part on the first, second, and third enthalpies of mid-casing packing leakage for each of the first, second, and third operating points and an assumed efficiency of the intermediate-pressure section;

(f) determines a linear relationship between the first, second, and third enthalpy difference values and the first, second, and third mid-casing packing leakage flow rate percentages for the first, second, and third operating points;

(g) reduces the assumed efficiency of the intermediate-pressure section by a predetermined incremental amount; and (h) repeats steps (e) through (g) until the linear relationship indicates that the first, second, and third mid-casing packing leakage flow rate percentages are substantially constant between the first, second, and third operating points.

14. The system of claim 13, wherein the mid-casing packing leakage flow rate percentages comprise percentages of mid-casing packing leakage flow rate values compared to flow rates of steam into the second inlet into the high-pressure section.

15. The system of claim 13, wherein the assumed efficiency is approximately equal to a true efficiency of the intermediate-pressure section when the linear relationship indicates the first, second, and third mid-casing packing leakage flow rate percentages are substantially constant between the first, second, and third operating points.

16. The system of claim 15, wherein the true efficiency of the intermediate-pressure section comprises the true efficiency of an intermediate-pressure section of an opposed flow steam turbine.

17. The system of claim 13, wherein the first, second, and third mid-casing packing leakage flow rate percentages are approximately equal to an actual mid-casing packing leakage flow rate percentage when the linear relationship indicates the first, second, and third mid-casing packing leakage flow rate percentages are substantially constant between the first, second, and third operating points.

18. The system of claim 13, wherein the steam turbine controller, when in operation, determines an initial value of the assumed efficiency of the intermediate-pressure section by adjusting the third apparent efficiency of the intermediate-pressure section based on the third estimated enthalpy of mid-casing packing leakage from the high-pressure section to the intermediate-pressure section.

19. The system of claim 13, wherein the steam turbine controller, when in operation, estimates the first, second, and third enthalpies of mid-casing packing leakage from the high-pressure section to the intermediate-pressure section using an enthalpy-drop expansion line based on test data and/or a steam turbine manufacturer's estimating method.

* * * * *